United States Patent
Yates

(10) Patent No.: US 12,435,663 B2
(45) Date of Patent: Oct. 7, 2025

(54) HYDROGEN FUELLED GAS TURBINE ENGINE

(71) Applicant: ROLLS-ROYCE PLC, London (GB)

(72) Inventor: Martin K Yates, Derby (GB)

(73) Assignee: ROLLS-ROYCE PLC, London (GB)

( * ) Notice: Subject to any disclaimer, the term of this patent is extended or adjusted under 35 U.S.C. 154(b) by 0 days.

(21) Appl. No.: 19/050,364

(22) Filed: Feb. 11, 2025

(65) Prior Publication Data

US 2025/0283428 A1    Sep. 11, 2025

(30) Foreign Application Priority Data

Mar. 5, 2024 (GB) ........................ 2403178

(51) Int. Cl.
| | | |
|---|---|---|
| F02C 3/22 | (2006.01) |
| B64D 37/34 | (2006.01) |
| F02C 7/224 | (2006.01) |
| F02C 7/232 | (2006.01) |

(52) U.S. Cl.
CPC ............... *F02C 3/22* (2013.01); *F02C 7/224* (2013.01); *F02C 7/232* (2013.01); *B64D 37/34* (2013.01); *F05D 2220/323* (2013.01)

(58) Field of Classification Search
CPC .. F02C 7/224; F02C 7/236; F02C 3/20; F02C 3/22; F02C 9/40; F02C 7/22; F02C 7/222; F02C 7/232; B64D 37/34
See application file for complete search history.

(56) References Cited

U.S. PATENT DOCUMENTS

| | | | |
|---|---|---|---|
| 10,989,117 B2 * | 4/2021 | Roberge | F02C 3/22 |
| 11,047,307 B2 * | 6/2021 | Roberge | F02C 3/22 |
| 11,434,823 B2 * | 9/2022 | Roberge | F02C 3/20 |
| 11,970,975 B2 * | 4/2024 | Palmer | F02C 7/222 |
| 12,006,871 B2 * | 6/2024 | Palmer | F02C 7/224 |

(Continued)

FOREIGN PATENT DOCUMENTS

| | | |
|---|---|---|
| EP | 4239170 A1 | 9/2023 |
| WO | 2024/028016 A1 | 2/2024 |

OTHER PUBLICATIONS

U.S. Appl. No. 19/050,368, filed Feb. 11, 2025 in the name of Martin K Yates.

(Continued)

*Primary Examiner* — Alain Chau
(74) *Attorney, Agent, or Firm* — Oliff PLC

(57) ABSTRACT

A fuel system for a gas turbine engine configured to combust hydrogen fuel. The fuel system includes a main fuel conduit, a fuel pump configured to operate on hydrogen within fuel conduit to provide pressurised fuel to core combustor of gas turbine engine, an auxiliary combustor downstream in fuel flow of fuel pump, and configured to combust a portion of fuel diverted from main fuel conduit and to heat remainder of fuel in main fuel conduit, and a fuel turbine downstream in fuel flow of the auxiliary combustor. The fuel turbine is configured to be driven by heated fuel from auxiliary combustor and configured to power the fuel pump. The fuel system comprises a turbine inlet valve provided upstream in hydrogen fuel flow of the fuel turbine and configured to control mass flow rate and/or pressure of fuel flowing into fuel turbine. 1. A method of operation is also described.

19 Claims, 4 Drawing Sheets

(56) References Cited

U.S. PATENT DOCUMENTS

| | | | |
|---|---|---|---|
| 12,012,897 B2* | 6/2024 | Nako | B64D 37/00 |
| 12,085,280 B2* | 9/2024 | Clark | F23R 3/005 |
| 12,228,078 B2* | 2/2025 | Lambert | F02C 9/32 |
| 2007/0277529 A1* | 12/2007 | Anand | F02C 7/224 |
| | | | 60/39.181 |
| 2011/0308252 A1* | 12/2011 | Kopecek | F01K 25/10 |
| | | | 60/660 |
| 2020/0088098 A1 | 3/2020 | Roberge | |
| 2020/0088102 A1* | 3/2020 | Roberge | F02C 7/224 |
| 2021/0207537 A1* | 7/2021 | Roberge | F02C 3/22 |
| 2021/0293182 A1* | 9/2021 | Nako | F02C 7/26 |
| 2022/0099020 A1* | 3/2022 | Palmer | F02C 9/26 |
| 2022/0099028 A1* | 3/2022 | Palmer | F23R 3/50 |
| 2022/0178307 A1* | 6/2022 | Palmer | F23R 3/283 |
| 2023/0167788 A1 | 6/2023 | Soto Carril | |
| 2023/0258148 A1 | 8/2023 | Ledwith, Jr. | |
| 2023/0280032 A1* | 9/2023 | Clark | F02C 7/224 |
| | | | 60/730 |
| 2024/0328358 A1* | 10/2024 | Barth | F02C 3/20 |
| 2024/0369021 A1* | 11/2024 | Lambert | F02C 9/40 |

OTHER PUBLICATIONS

Oct. 21, 2024 Combined Search and Examination Report issued in British Patent Application No. GB2403172.6.
Jul. 10, 2025 Extended European Search Report issued in European Patent Application No. 25155909.2.
Jul. 10, 2025 Extended European Search Report issued in European Patent Application No. 25155910.0.
May 20, 2025 Office Action issued in U.S. Appl. No. 19/050,368.

* cited by examiner

HYDROGEN FUELLED GAS TURBINE ENGINE

TECHNICAL FIELD

This disclosure relates to a fuel system for a hydrogen fuelled gas turbine engine, a gas turbine engine including such a fuel system, aircraft comprising such engines, and methods of controlling such fuel systems and engines.

BACKGROUND

Hydrogen fuelled aircraft have been proposed, in which the hydrogen is stored in the form of a liquid, in order to improve density of the fuel. However, such hydrogen must first be warmed to higher temperatures and pumped to high pressures at high flow rates prior to combustion.

Challenges in conditioning the liquid hydrogen include the high power required to raise the temperatures and pressures at the required flow rate, as well as controlling complex pumping and heating systems such that the required flow, pressures and temperatures can be produced at all phases of flight.

SUMMARY

In a first aspect, there is provided a fuel system for a gas turbine engine configured to combust hydrogen fuel, the fuel system comprising:
  a main fuel conduit;
  a fuel pump configured to operate on hydrogen within the fuel conduit to provide pressurised fuel to a core combustor of the gas turbine engine;
  an auxiliary combustor downstream in fuel flow of the fuel pump, and configured to combust a portion of fuel diverted from the main fuel conduit and to heat a remainder of fuel in the main fuel conduit; and
  a fuel turbine downstream in fuel flow of the auxiliary combustor, the fuel turbine being configured to be driven by the heated fuel from the auxiliary combustor and configured to power the fuel pump; wherein
  the fuel system comprises a turbine inlet valve provided upstream in hydrogen fuel flow of the fuel turbine configured to control mass flow rate and/or pressure of fuel flowing into the fuel turbine.

Advantageously, the fuel system conditions fuel in an efficient, controllable manner. The provision of a fuel turbine provides for efficient driving power to enable operation of the pump, to raise the pressure of the fuel, while the auxiliary combustor both raises the temperature of the fuel and provides enthalpy to drive the turbine. The provision of the turbine inlet valve which provides for selective inlet flow control of the fuel turbine provides for independent control of the turbine driven fuel pump, which provides for independent temperature and pump pressure control.

The fuel turbine may be configured to mechanically drive the fuel pump, and/or may be configured to drive an electrical generator. Advantageously, excess energy from the fuel turbine can be utilised by the aircraft.

The fuel pump may be coupled to an electric motor. Advantageously, where the fuel turbine cannot provide sufficient power to fully operate the fuel pump, power can be introduced by the electric motor.

The fuel system may comprise a fuel storage unit configured to store cooled hydrogen, which may be configured to store liquid hydrogen or cryogenically cooled compressed gaseous or supercritical hydrogen.

The fuel storage unit may be configured to store hydrogen as a liquid at a temperature of less than 30 Kelvin (K), and may be configured to store hydrogen at a temperature less than 25K, and may be configured to store hydrogen at a pressure of between 1 and 4 Bar.

The fuel pump may be configured to provide a maximum pressure ratio of between 10:1 and 100:1, and may be configured to provide a maximum pressure ratio of between 15:1 and 60:1, and may be configured to provide a maximum pressure ratio of approximately 20:1.

The fuel system may comprise a turbine bypass conduit configured to selectively bypass fuel around the fuel turbine.

The fuel system may comprise an actively controllable turbine bypass valve configured to control mass flow rate and/or pressure of fuel flowing through the fuel turbine bypass conduit.

The fuel system may comprise a turbine outlet valve provided downstream in hydrogen fuel flow of the fuel turbine configured to control mass flow rate and/or pressure of fuel flowing out of the fuel turbine. Advantageously, further control of the fuel turbine can be provided, either concurrently or redundantly with the turbine bypass.

The fuel system may comprise a controller configured to control at least the auxiliary combustor and turbine inlet valve and, optionally, the electric motor, turbine bypass and/or turbine outlet valve to control pressure, temperature and flow rate of fuel within the fuel system.

The controller may be configured to operate at least one of the auxiliary combustor and turbine inlet valve and, optionally, the electric motor, turbine bypass and/or turbine outlet valve to provide a constant fuel pump rotational speed. Advantageously, as input power by the turbine varies, pump speed is kept constant by additional torque input by the electric motor.

Alternatively, the controller may be configured to operate at least one of the auxiliary combustor and turbine inlet valve and, optionally, the electric motor, turbine bypass and/or turbine outlet valve to provide a variable pump rotational speed, which varies in accordance with a schedule in accordance with fuel flow demand.

In a second aspect there is provided a gas turbine engine comprising the fuel system of the first aspect.

In a third aspect there is provided an aircraft comprising a gas turbine engine of the second aspect.

In a fourth aspect, there is provided a method of operating a fuel system of the first aspect, the method comprising:
  controlling, by a controller of a fuel system of the first aspect, at least auxiliary combustor fuel flow to control auxiliary combustor exit temperature, and a fuel turbine inlet valve position to control fuel turbine speed, such that a required hydrogen pressure, temperature and flow rate is provided downstream of the fuel turbine.

BRIEF DESCRIPTION OF THE DRAWINGS

An embodiment will now be described by way of example only with reference to the accompanying drawings, which are purely schematic and not to scale, and in which.

DETAILED DESCRIPTION

Figure 1:
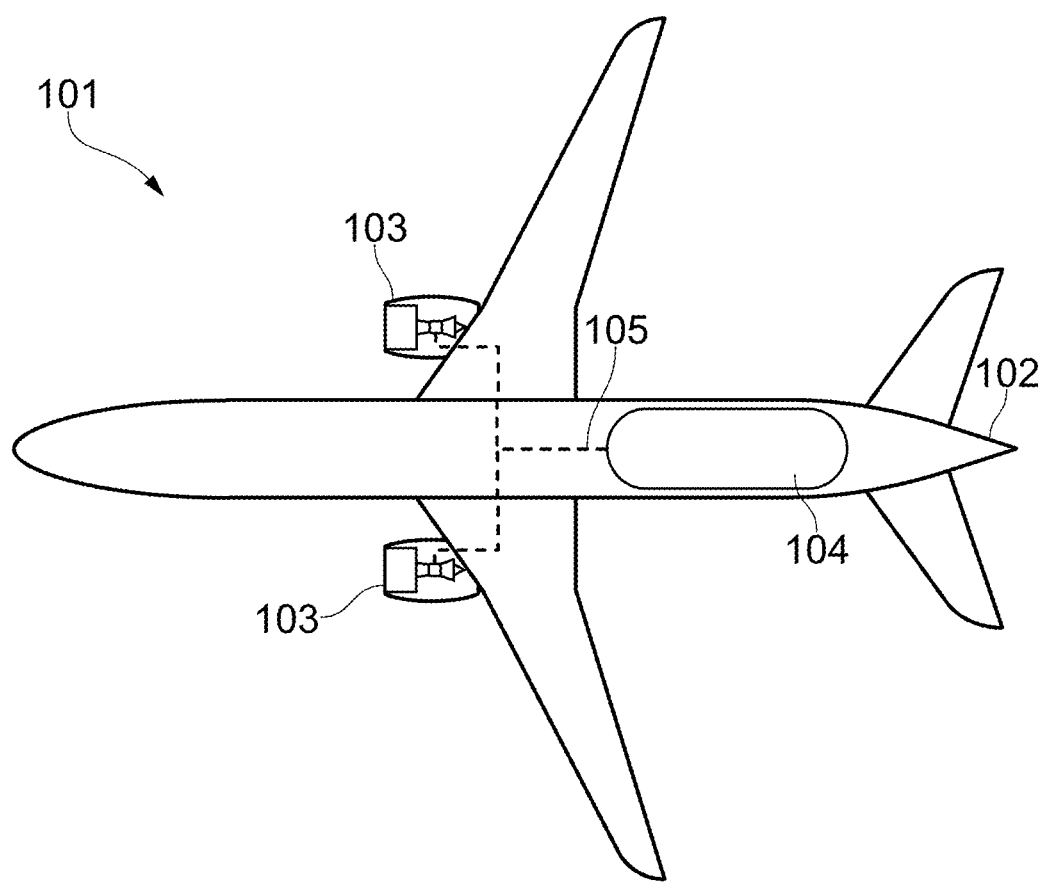
FIG. 1 shows an airliner comprising a hydrogen powered gas turbine engine.

A cryogenic hydrogen fuelled airliner is illustrated in FIG. 1. In this example, the airliner 101 is of substantially conventional tube-and-wing twinjet configuration with a central fuselage 102 and substantially identical engines 103 which are mounted in an underwing configuration.

A cryogenic fuel storage system 104 is located in the fuselage 102 and is connected to the engines 103 via a fuel delivery system 105.

In the present embodiment, the cryogenic fuel is hydrogen stored as a liquid, below its boiling point. In a specific embodiment, the cryogenic fuel storage system 104 is configured to store the hydrogen fuel at 25 Kelvin. In the present embodiment, the hydrogen fuel is pressurised to a pressure from 1 to 3 bar, and in a specific example, 2 bar. It will be appreciated that the principles of the present invention may be extended to hydrogen fuel stored at higher pressures and/or temperatures and may be applicable to hydrogen stored as either a compressed gas or a supercritical fluid.

Figure 2:
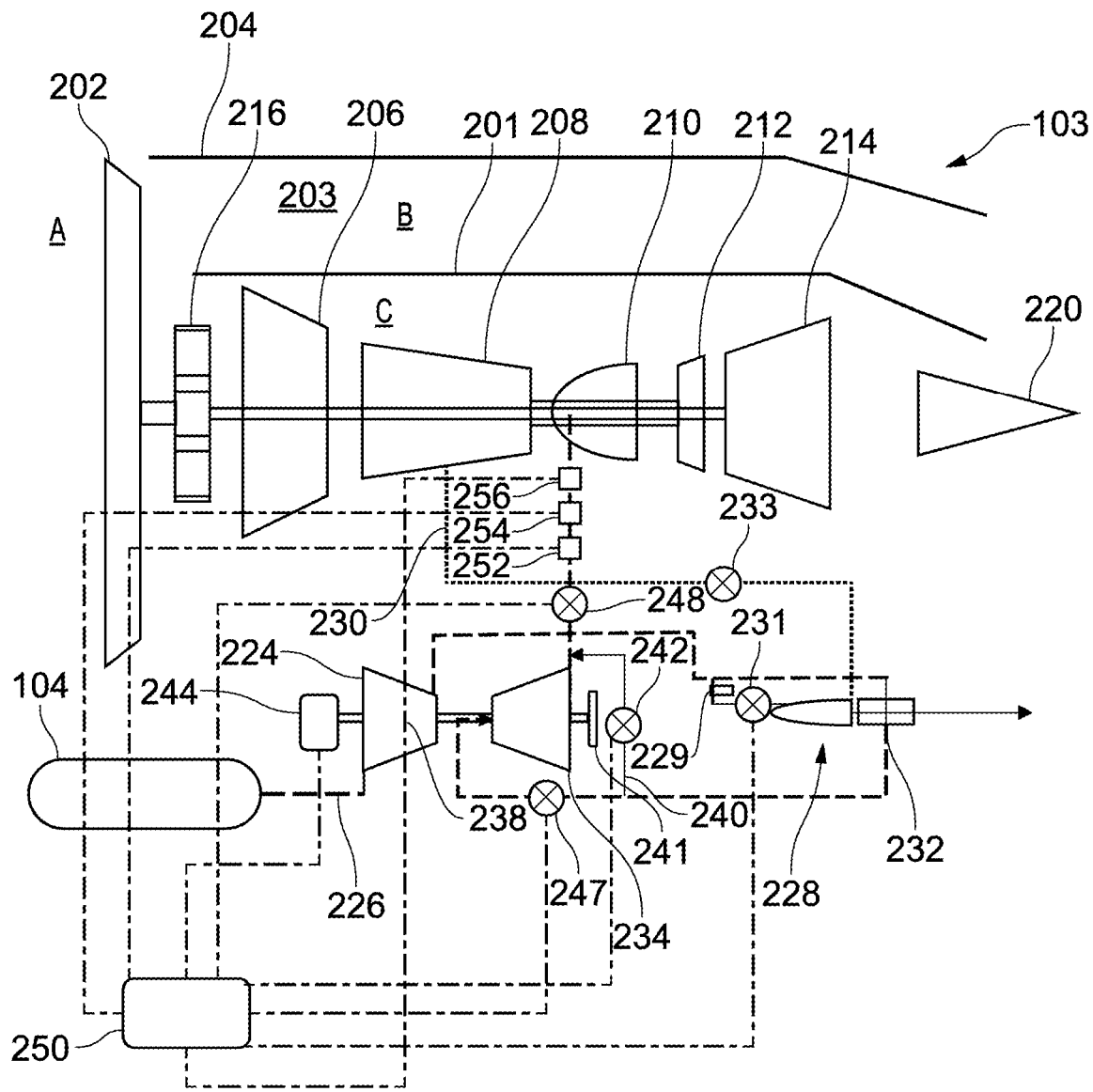
FIG. 2 shows a fuel system and gas turbine engine of FIG. 1.

A block diagram of one of the engines 103 is shown in FIG. 2.

In the present embodiment, the engine 103 is a turbofan comprising a ducted fan 202 located in a nacelle 204. The fan 202 receives intake air A and generates two airflows: a bypass flow B which passes axially through a bypass duct 203 and a core flow C which enters the gas turbine core 201.

The gas turbine core 201 comprises, in axial flow series, a low-pressure compressor 206, a high-pressure compressor 208, a combustor 210, a high-pressure turbine 212, and a low-pressure turbine 214.

In operation, the core flow C is compressed by the low-pressure compressor 206 and is then directed into the high-pressure compressor 208 where further compression takes place. The compressed air exhausted from the high-pressure compressor 208 is directed into the combustor 210 where it is mixed with fuel and the mixture is combusted.

Following combustion, the resultant hot combustion products are discharged from the combustor 210 and expand through, and thereby drive, the high-pressure turbine 212 and in turn the low-pressure turbine 214.

The fan 202 is driven by the low-pressure turbine 214 via a reduction gearbox 216. In the present embodiment, the reduction gearbox 216 takes the form of an epicyclic gearbox. In alternative arrangement, the gearbox may be omitted and the engine 103 configured as a direct-drive engine, either in a two-spool or three-spool arrangement.

Turning now to the hydrogen fuel flow, hydrogen fuel from the hydrogen storage system 104 is provided to a high-pressure fuel pump 224 via a hydrogen fuel conduit 226, shown by the dashed line in FIG. 2. Fuel upstream of the high-pressure pump 224 is generally in a liquid state. One or more separate low-pressure pumps (not shown) may also be provided upstream of the high-pressure pump 224. Though the hydrogen fuel pump 224 is shown as a single component in FIG. 2, it will be appreciated that the hydrogen fuel pump may comprise a plurality of stages, each configured to raise the pressure of the fuel for delivery to a subsequent stage.

In general, the fuel pump 224 comprises a multi-stage centrifugal pump configured to provide a fuel pressure ratio of between 10:1 and 100:1 at aircraft maximum take-off power conditions. In other words, the ratio between fuel pressure and atmospheric pressure during take-off is between 10:1 and 100:1. As will be appreciated, maximum take-off thrust for a given engine can be defined as the maximum thrust for which an engine is certified. Typically, this will be achieved at a speed above static, such as approximately Mach 0.25. Maximum thrust may be flat-rated, or may vary according to temperature, with the highest thrust available at any temperature for which the engine is certified defining the maximum take-off thrust. In one embodiment modelled by the inventors, the fuel pump is configured to provide a pressure ratio of approximately 100:1, and provides fuel at an outlet at a temperature of approximately 33 K or higher. At these conditions, the hydrogen is in a supercritical state.

Such a high-pressure ratio is required to provide the fuel at the conditions necessary for downstream components, as will be described in more detail below.

Downstream in hydrogen fuel flow of the pump 224 is a fuel preheater 228. The fuel pre-heater 228 is configured to raise the temperature of the hydrogen fuel, which is typically still in a liquid phase, downstream of the pump 224. The pre-heater 228 serves two main roles-firstly, to raise the temperature of fuel downstream to a temperature suitable for combustion in the gas turbine engine core combustor 210, and also to provide additional enthalpy in the hydrogen fuel flow downstream, for purposes explained below.

The pre-heater 228 comprises an auxiliary combustor which is configured to draw on a portion of fuel tapped off from the hydrogen fuel conduit 226 via an offtake 229 and combust this fuel with compressed air drawn from the high-pressure compressor 208 via a bleed air line 230, shown by the dotted line in FIG. 2. Combustion gases from the auxiliary combustor are used to heat hydrogen in the conduit 226 via a heat exchanger 232. Consequently, fuel downstream of the heat exchanger 232 is typically vaporised and is now in either a gaseous or supercritical phase.

Fuel flow into the pre-heater 228, and therefore heat output of the pre-heater 228, is controlled by a fuel flow valve 231. One or more bleed valves 233 are typically provided to control bleed air flow into the pre-heat 228, to provide a desired fuel-air ratio.

Hydrogen downstream of the pre-heater 228 is typically at substantially the same pressure as hydrogen upstream, with only slight pressure losses being encountered. The temperature of the hydrogen downstream of the pre-heater 228 is raised, with typical temperatures being between 250 and 300 K at maximum take-off conditions, and in one example, 288K.

A fuel turbine 234 is provided downstream in hydrogen fuel flow of the pre-heater 228. The fuel turbine 234 is configured to extract mechanical power from the heated, gaseous hydrogen in the fuel conduit 226 downstream of the pre-heater 228.

The fuel turbine 234 comprises an axial or centrifugal turbine, which may for instance comprise a lightweight, strong material such as aluminium. Aluminium is chosen because of its high tensile strength, and the relatively low temperatures as the inlet conditions. Additionally, aluminium is resistant to hydrogen embrittlement. Suitable alternative materials include stainless steel.

A fuel turbine bypass conduit 240 may be provided, which fluidly couples an upstream in hydrogen fuel flow side of the turbine 234 to a downstream in hydrogen fuel flow side of the turbine 234, bypassing the turbine impellor, such that a portion of hydrogen within the conduit 224 can bypass the turbine 234, without flowing therethrough.

A bypass valve 242 may also be provided, which provides for selective control of a mass flow rate of hydrogen flowing through the bypass conduit 240, and thereby also controls mass flow of hydrogen fuel flow through the turbine 234. Any suitable valve may be utilised. Examples include throttle valves such as butterfly valves.

One or more injectors (not shown) are provided downstream in hydrogen fuel flow of the fuel turbine 234. The injectors provide hydrogen to the combustor 210 at an injection temperature and pressure. Typically, in order to provide sufficient flow into the combustor 210, the injectors are configured to be operated at an injection pressure ratio of approximately 2:1, and in this example, 2.1:1. The injectors also require fuel at a minimum injector delivery temperature. The minimum injector delivery temperature is defined by a minimum temperature necessary for the hydrogen to provide stable combustion within the combustor 210 in the volume provided. Additional considerations for the minimum delivery temperature include icing. As such, a minimum delivery temperature may comprise 273 K to avoid icing, or may comprise a lower temperature such as 150K to ensure combustion stability.

The fuel turbine 234 and fuel pump 224 are coupled by a drive arrangement comprising a shaft 238. The shaft 238 couples the turbine 234 and pump 224 such that they rotate together. An electrical motor 244 is also optionally coupled to the shaft 238. As such, the fuel turbine 234 at least partly drives the fuel pump 224, with additional power optionally being provided by the motor 244. Further loads may also be driven by the fuel turbine 234, such as an electrical generator 241.

Optionally, a turbine outlet throttle valve 248 may be provided, downstream in hydrogen fuel flow of the turbine 234, and upstream of the combustor 210. The throttle valve 248 is configured to control mass flow and/or pressure of the fuel flowing therethrough, and may comprise any suitable valve such as a butterfly valve.

A fuel turbine inlet throttle valve 247 is provided upstream in hydrogen fuel flow of the fuel turbine 234. The throttle valve 248 is configured to control mass flow and/or pressure of the fuel flowing therethrough, and again may comprise any suitable valve such as a butterfly valve. As such, flow rate and pressure upstream of the turbine 234 can be controlled independently of operation of the pre-heater 228. Optionally, where the bypass valve 242 is present, flow rate and pressure can be controlled in conjunction with the bypass valve 242. Further independent control can be provided by the outlet valve 248, where present.

In operation, the engine operates as follows.

Hydrogen is delivered from the fuel tank 104 to the fuel pump 224, where fuel pressure is increased. Where the hydrogen is provided from the tank as a liquid, the pump typically maintains the hydrogen in liquid phase. This fuel is delivered to the pre-heater 228. When the preheater 228 is operational, a portion of the fuel is diverted to the auxiliary combustor 228, where it is combusted with air, while the remainder is heated by heat exchange with preheater exhaust gases in the preheater. The portion diverted to the auxiliary combustor 228 is controlled by the valve 231. Where the preheater is non-operational, hydrogen passes through the preheater 228 without being significantly heated. Hydrogen fuel is then delivered to the fuel turbine 234 where it is expanded, and provided to the injectors 206. A portion of hydrogen fuel may bypass the turbine 234 via the bypass conduit 240, in accordance with operation of the valve 242.

In driving the turbine 234, torque is generated, which is provided to the pump 224 via the shaft 238. Additional torque can be provided to the pump 234 from the motor 244 where required.

Operation of the fuel system is controlled by a controller 250, which controls at least the valves 231, 247 to control auxiliary combustor 228 fuel flow and turbine inlet flow pressure respectively. The controller 250 controls at least the valves 231, 247 and, optionally, the motor 244, and turbine bypass and outlet valves 242, 248 such that each of a pressure, flow rate and delivery temperature requirements are met during all stages of flight.

As will be understood, the minimum pressure requirement must be met such that the compressor delivery pressure P30 can be overcome to permit fuel to flow into the combustor 210, i.e. there must be a positive pressure gradient between the fuel in the fuel conduit 226 and compressor air delivered to the combustor 210. On the other hand, an excessively high pressure represents wasted energy in the fuel system and may also result in damage to the fuel system, or excessive flame length, which may in turn damage the turbine 212, 214. Similarly, the minimum temperature must be met to avoid icing, and/or provide stable combustion. Again, an excessive fuel temperature represents wasted energy, and may also damage engine components. Finally, the fuel mass flow rate must be controlled to within a relatively small margin (i.e. neither substantially greater than, nor less than a desired value), to provide accurate thrust control of the engine 201. The rate of change of fuel flow is also important, to provide both acceptable engine acceleration, and to avoid surge and stall.

Figure 3:
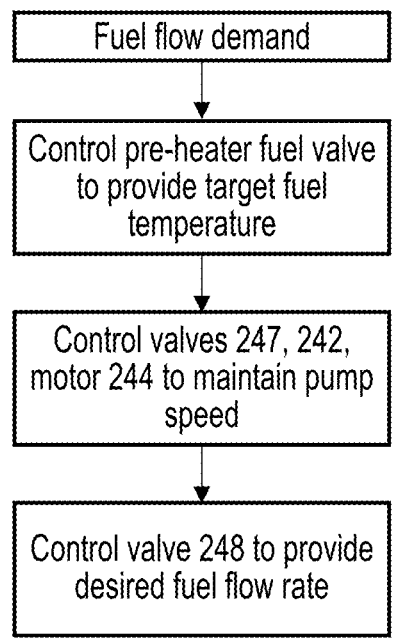
FIG. 3 shows a first control method for operating the fuel system of FIG. 2.

FIG. 3 illustrates a method of controlling the fuel system to meet the flow requirements.

In a first step, the valve 231 is controlled to control fuel flow to the auxiliary combustor 228 to provide target fuel conditions downstream. The hydrogen flows through the turbine 234, thereby driving the pump 224. Separate pressure, temperature and flow sensors 252, 254, 256 are provided downstream of the fuel turbine 234, upstream of the injector for the combustor 210 to determine hydrogen fuel flow conditions at the injector.

As mentioned, each of a minimum fuel temperature, a minimum combustor entry pressure, and a desired fuel flow rate must be provided.

In general, the auxiliary combustor 228 is controlled to ensure that the fuel temperature requirements are met, i.e. that the fuel is above a predetermined minimum temperature. This may be controlled on the basis of "closed loop control", and could utilise conventional control methods, such as Proportional, Integral, Derivative (PID) control.

In order to control fuel flow rate to a predetermined level, at least the turbine inlet valve 247, and optionally the bypass valve 242 and turbine outlet valve 248 are controlled in accordance with a control schedule.

In general, the turbine outlet valve 248 is operated as a Fuel Metering Unit (FMU), which is operated in accordance with a schedule based on a commanded fuel flow demand rate. The fuel flow demand rate is in turn determined by a throttle position or auto-throttle demand.

Where an increased fuel flow demand is made, the turbine outlet valve 248 is opened to allow increased flow, while the valve 248 is closed to provide reduced flow.

In order for the outlet valve 248 to have sufficient bandwidth to provide throttle control over the full range of operation, it may be desirable for the pump 224 to operate at a constant speed. As such, a constant pump speed setpoint is defined, and the turbine inlet valve 247 and, optionally, the turbine bypass valve 247 and electric motor 244 are controlled to provide the desired pump speed.

As such, the turbine inlet valve 247 can be operated to turn down the work available to the turbine 234, and thereby the pump 224 speed, with a more closed valve position generally resulting in reduced turbine work, and so reduced pump speed, compared to where the valve 247 is open. As such, closing the valve 247 will reduce pump 224 work, and so reduce both mass flow and pressure, while opening the valve 247 will increase pump work, and increase mass flow and pressure. Meanwhile, the overall temperature of the fuel downstream of the fuel turbine is generally unaffected, irrespective of position of the valve 247.

In some cases however, the required pump speed may still not be provided even in the event where the bypass valve 247 is fully open, and the fuel turbine 234 is operating at full capacity. In such a case, the motor 244 may be operated, to provide additional torque to the pump 224. In one embodiment, the motor 244 is controlled to provide a variable torque to maintain a constant pump rotational speed setpoint. As such, pressure and flow rate conditions downstream of the pump are less variable than where the motor is not present, and control is greatly simplified. Such a mode of operation may be necessary during start-up, where pressure and flow requirements are relatively low, but little compressor air is available to drive the preheater 228, and as such, relatively little enthalpy is available to drive the fuel turbine 234.

In one case, the turbine bypass valve 242 may also be operated in a similar manner to the inlet valve 247, to control turbine work. In general, opening the bypass valve 247 will reduce turbine work, and so reduce pump speed, as less mass flow passes through the turbine. This control could be in addition to operation of the inlet valve 247, with the valves 242, 247 working in concert to control turbine work. Alternatively, the valves 242, 247 could provide redundant control, ensuring that turbine work control, and therefore pump speed control is assured in the event of the failure of one of the valves 242, 247.

Operating the pump 224 at a fixed speed will guarantee that sufficient pressure head is available for full operation of the valve 248. However, as will be appreciated, the pressure head will be greater than that required during most operational conditions, leading to wasted pump work. In general, fuel flow demand in large gas turbine engines varies slowly, over the course of several seconds, and so it may be desirable to operate the pump at a variable flow rate. On the other hand, excess work generated by the pump 224 may result in additional heat, which may allow for reduced operation of the pre-heater 228, and so a low overall drop in efficiency.

Figure 4:
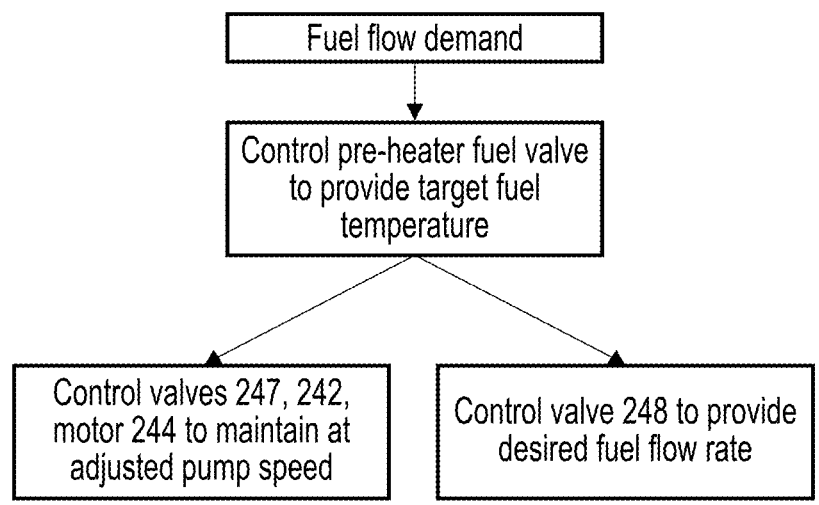
FIG. 4 shows a second control method for operating the fuel system of FIG. 2.

FIG. 4 illustrates an alternative control method. This control method has the advantage that fuel pressure upstream of the valve 248 can be varied.

In this control method, the valve 248 is operated as before in accordance with fuel flow demand. The valve 248 will operate relatively slowly in accordance with a fuelling schedule, as rapid increase or reduction in fuel flow may result in flameout or turbine damage, as will be understood in the field of gas turbine engine control.

However, in some cases, the pump 224 can be controlled more rapidly in response to changes in fuel flow demand, in view of its smaller rotational mass. As such, in response to an increase in fuel flow demand, the pump target rotational speed (and so pressure and flow rate) is increased in advance of increases in valve 248 position. Similarly, pump target rotational speed can be reduced in advance of decreases in valve 248 position.

As shown in FIG. 4 therefore, the system operates in accordance with a modified schedule. The first and second steps are the same as before, as the pre-heater 228 is controlled to maintain fuel temperature.

Fuel flow demand signals are sent to the controller 250, which calculates a valve 248 setpoint position to provide the required flow rate. Before, or as the valve 248 is moved toward the new setpoint, a new pump rotational speed setpoint is also calculated, which will provide sufficient pressure head to the valve 248 to enable a required fuel flow at the valve 248 setpoint. The controller then controls both the valve 248 to control the fuel flow demand, and the valves 247, 242 and motor 244 to provide the required pump rotational speed.

As such, less pressure is wasted by the system in most operational conditions.

In one embodiment, the valve 242 may normally be operated in a part open state. As such, the valve can be opened or closed to provide either rapid increase or decrease in fuel flow demand as required.

Further control is provided by operation of either or both of the throttle valves 247, 248 and motor 244. Operation of the throttle valve 247 can provide even more rapid control of fuel flow, at the expense of energy wasted by throttling the flow. As such. Similarly, where insufficient mass flow or pressure is provided where the valve 242 is fully closed, additional pump torque can be provided by the motor 244.

Alternative embodiments can be envisaged. For example, the fuel turbine may comprise multiple stages coupled to respective stages of the fuel pump in a similar manner to the multiple compressor and turbine stages of the gas turbine engine. The hydrogen fuel could be stored as a low temperature gas or supercritical fluid. Other control schemes could be envisaged, such as model-based control.

The invention claimed is:

1. A fuel system for a gas turbine engine configured to combust hydrogen fuel, the fuel system comprising:
a main fuel conduit;
a fuel pump configured to operate on hydrogen within the fuel conduit to provide pressurised fuel to a core combustor of the gas turbine engine;
an auxiliary combustor downstream in fuel flow of the fuel pump, and configured to combust a portion of fuel diverted from the main fuel conduit and to heat a remainder of fuel in the main fuel conduit; and
a fuel turbine downstream in fuel flow of the auxiliary combustor, the fuel turbine being configured to be driven by the heated fuel from the auxiliary combustor and configured to power the fuel pump; wherein
the fuel system comprises a fuel turbine inlet valve provided upstream in hydrogen fuel flow of the fuel turbine configured to control mass flow rate and/or pressure of fuel flowing into the fuel turbine, and
the fuel system further comprises one or more sensors for providing information on pressure, temperature and flow of fuel downstream of the fuel turbine to a controller, the controller configured to control at least the auxiliary combustor and the fuel turbine inlet valve and provide desired pressure, temperature and flow rate of fuel downstream of the fuel turbine.

2. The fuel system according to claim 1, wherein the fuel turbine is configured to mechanically drive the fuel pump, and/or configured to drive an electrical generator.

3. The fuel system according to claim 1, wherein the fuel pump is coupled to an electric motor.

4. The fuel system according to claim 1 comprising a fuel storage unit configured to store cooled hydrogen.

5. The fuel system according to claim 4, wherein the fuel storage unit is configured to store hydrogen as a liquid at a temperature of less than 30 Kelvin (K).

6. The fuel system according to claim 4, wherein the fuel storage unit is configured to store hydrogen as a liquid at a temperature less than 25K.

7. The fuel system according to claim 4, wherein the fuel storage unit is configured to store hydrogen as a liquid at a pressure of between 1 and 4 Bar.

8. The fuel system according to claim 1, wherein the fuel pump is configured to provide a maximum pressure ratio of between 10:1 and 100:1.

9. The fuel system according to claim 1 comprising a fuel turbine bypass conduit configured to selectively bypass fuel around the fuel turbine, and an actively controllable fuel turbine bypass valve configured to control mass flow rate and/or pressure of fuel flowing through the fuel turbine bypass conduit.

10. The fuel system according to claim 1 comprising a fuel turbine outlet valve provided downstream in hydrogen fuel flow of the fuel turbine configured to control mass flow rate and/or pressure of fuel flowing out of the fuel turbine.

11. The fuel system according to claim 1 wherein the controller is further configured to control one or more of an electric motor coupled to the fuel pump, a fuel turbine bypass valve for selectively bypassing fuel around the fuel turbine, and a fuel turbine outlet valve provided downstream in hydrogen fuel flow of the fuel turbine.

12. The fuel system according to claim 11, wherein the controller is further configured to operate the auxiliary combustor and the fuel turbine inlet valve, and optionally further configured to control one or more of the electric motor, the fuel turbine bypass valve and the fuel turbine outlet valve, to provide a constant fuel pump rotational speed.

13. The fuel system according to claim 11, wherein the controller is further configured to operate the auxiliary combustor and the fuel turbine inlet valve and optionally further configured to operate one or more of the electric motor, the fuel turbine bypass valve and the fuel turbine outlet valve, to provide a variable fuel pump rotational speed, which varies in accordance with a schedule in accordance with fuel flow demand.

14. The fuel system according to claim 1 comprising a fuel storage unit configured to store liquid hydrogen or cryogenically cooled compressed gaseous or supercritical hydrogen.

15. The fuel system according to claim 1, wherein the fuel pump is configured to provide a maximum pressure ratio of between 15:1 and 60:1.

16. The fuel system according to claim 1, wherein the fuel pump is configured to provide a maximum pressure ratio of approximately 20:1.

17. A gas turbine engine comprising the fuel system according to claim 1.

18. An aircraft comprising the gas turbine engine according to claim 17.

19. A method comprising controlling, by the controller of the fuel system in accordance with claim 1, at least auxiliary combustor fuel flow to control auxiliary combustor exit temperature, and a fuel turbine inlet valve position to control fuel turbine speed, such that a required hydrogen pressure, temperature and flow rate is provided downstream of the fuel turbine.

* * * * *